United States Patent
Motoyama

(10) Patent No.: US 6,970,952 B2
(45) Date of Patent: Nov. 29, 2005

(54) SYSTEM USES INTERNET ELECTRONIC MAIL FOR COMMUNICATING STATUS OF A MONITORED DEVICE TO A MONITORING DEVICE

(75) Inventor: Tetsuro Motoyama, Cupertino, CA (US)

(73) Assignees: Ricoh Company, Ltd., Tokyo (JP); Ricoh Corporation, San Jose, CA (US)

( * ) Notice: Subject to any disclaimer, the term of this patent is extended or adjusted under 35 U.S.C. 154(b) by 79 days.

(21) Appl. No.: 08/738,461

(22) Filed: Oct. 30, 1996

(65) Prior Publication Data

US 2003/0172115 A1 Sep. 11, 2003

Related U.S. Application Data

(62) Division of application No. 08/463,002, filed on Jun. 5, 1995, now Pat. No. 5,819,110.

(51) Int. Cl.[7] .............................. G06F 3/00; G06F 15/16
(52) U.S. Cl. .......................... 710/15; 709/206; 709/224
(58) Field of Search ............................ 345/828, 182.02, 345/114; 370/395, 409, 252, 384, 401; 379/88.22; 710/15; 709/206, 224

(56) References Cited

U.S. PATENT DOCUMENTS

| | | | | |
|---|---|---|---|---|
| 4,551,842 A | * | 11/1985 | Segarra | 395/182.02 |
| 5,163,045 A | * | 11/1992 | Caram et al. | 370/409 |
| 5,412,779 A | | 5/1995 | Motoyama | |
| 5,414,707 A | * | 5/1995 | Johnston et al. | 370/395 |
| 5,526,483 A | * | 6/1996 | French et al. | 395/182.02 |
| 5,537,554 A | | 7/1996 | Motoyama | |
| 5,537,626 A | * | 7/1996 | Kraslavsky et al. | 395/828 |
| 5,544,289 A | * | 8/1996 | Motoyama | 395/280 |
| 5,561,662 A | * | 10/1996 | Kakuma et al. | 370/252 |
| 5,568,618 A | * | 10/1996 | Motoyama | 395/280 |
| 5,577,172 A | * | 11/1996 | Vatland et al. | 395/114 |
| 5,579,314 A | * | 11/1996 | Jones | 370/384 |
| 5,621,727 A | * | 4/1997 | Vaudreuil | 370/401 |
| 5,715,393 A | | 2/1998 | Naugle | |
| 5,740,231 A | * | 4/1998 | Cohn et al. | 379/88.22 |
| 5,774,678 A | | 6/1998 | Motoyama | |
| 5,819,110 A | | 10/1998 | Motoyama | |
| 5,887,216 A | | 3/1999 | Motoyama | |
| 6,003,070 A | | 12/1999 | Frantz | |
| 6,065,136 A | | 5/2000 | Kuwabara | |
| 6,473,812 B2 | | 10/2002 | Motoyama | |

FOREIGN PATENT DOCUMENTS

| | | |
|---|---|---|
| JP | 2-172348 | 7/1990 |
| JP | 04-068959 | 3/1992 |
| JP | 06-046161 | 2/1994 |
| WO | WO 92/22033 | 12/1992 |

OTHER PUBLICATIONS

U.S. Appl. No. 08/738,461, filed Oct. 30, 1996, Motoyama.

(Continued)

*Primary Examiner*—Le Hien Luu
(74) *Attorney, Agent, or Firm*—Oblon, Spivak, McClelland, Maier & Neustadt, P.C.

(57) ABSTRACT

A method and system for monitoring, controlling and diagnosing operation of a machine such as a business office machine including a facsimile machine, a copier, and a printer. When the speed of communication between the remote device and machine is not urgent, a connectionless mode of communication may be used. The form of connectionless communication is an electronic mail message transmitted over the Internet. However, when a condition needs urgent action, a direct connection is used for communication such as communication via a telephone or ISDN line. The information obtained from the machine is stored in one or more data bases within a company and information of the machine is shared between a service department, engineering and design department, manufacturing department, and marketing department. As communication over the Internet via electronic mail is not secure, the connectionless-mode messages transmitted using Internet electronic mail are encrypted.

54 Claims, 11 Drawing Sheets

OTHER PUBLICATIONS

U.S. Appl. No. 10/933,519, filed Sep. 3, 2004, Motoyama.
U.S. Appl. No. 10/830,064, filed Apr. 23, 2004, Motoyama et al.
U.S. Appl. No. 10/831,187, filed Apr. 26, 2004, Motoyama et al.
U.S. Appl. No. 10/784,831, filed Feb. 24, 2004, Motoyama et al.
U.S. Appl. No. 10/736,678, filed Dec. 17, 2003, Motoyama.
U.S. Appl. No. 10/702,485, filed Nov. 7, 2003, Motoyama.
U.S. Appl. No. 10/684,434, filed Oct. 15, 2003, Motoyama et al.
U.S. Appl. No. 10/660,527, filed Sep. 12, 2003, Motoyama.
U.S. Appl. No. 10/665,536, filed Sep. 22, 2003, Motoyama.
U.S. Appl. No. 10/100,109, filed Mar. 19, 2002, Motoyama.
U.S. Appl. No. 10/326,098, filed Dec. 23, 2002, Motoyama.
U.S. Appl. No. 08/738,461, filed Oct. 30, 1996, pending.
U.S. Appl. No. 09/782,164, filed Feb. 14, 2001, pending.
U.S. Appl. No. 09/782,083, filed Feb. 14, 2001, pending.
U.S. Appl. No. 09/782,064, filed Feb. 14, 2001, pending.
U.S. Appl. No. 09/782,187, filed Feb. 14, 2001, pending.
U.S. Appl. No. 09/756,120, filed Jan. 9, 2001, pending.
U.S. Appl. No. 09/668,162, filed Sep. 25, 2000, pending.
U.S. Appl. No. 09/575,710, filed Jul. 25, 2000, pending.
U.S. Appl. No. 09/575,702, filed Jul. 12, 2000, pending.
U.S. Appl. No. 09/453,934, filed May 17, 2000, pending.
U.S. Appl. No. 09/453,935, filed May 17, 2000, pending.
U.S. Appl. No. 09/453,936, filed May 17, 2000, pending.
U.S. Appl. No. 09/453,937, filed May 17, 2000, pending.
U.S. Appl. No. 09/440,692, filed Nov. 16, 1999, pending.
U.S. Appl. No. 09/440,647, filed Nov. 16, 1999, pending.
U.S. Appl. No. 09/440,646, filed Nov. 16, 1999, pending.
U.S. Appl. No. 09/440,693, filed Nov. 16, 1999, pending.
U.S. Appl. No. 09/440,645, filed Nov. 16, 1999, pending.
U.S. Appl. No. 09/520,368, filed Mar. 7, 2000, pending.
U.S. Appl. No. 09/542,284, filed Apr. 4, 2000, pending.
U.S. Appl. No. 09/457,669, filed Dec. 9, 1999, pending.
U.S. Appl. No. 09/453,877, filed Feb. 4, 2000, pending.
U.S. Appl. No. 08/883,492, filed Jun. 26, 1997, pending.
U.S. Appl. No. 08/880,683, filed Jun. 23, 1997, pending.
U.S. Appl. No. 08/916,009, filed Aug. 21, 1997, pending.
U.S. Appl. No. 09/108,705, filed Jul. 1, 1998, pending.
U.S. Appl. No. 09/107,989, filed Jul. 1, 1998, pending.
U.S. Appl. No. 09/192,583, filed Nov. 17, 1998, pending.
U.S. Appl. No. 09/311,148, filed May 13, 1999, pending.
U.S. Appl. No. 09/408,443, filed Sep. 29, 1999, pending.
U.S. Appl. No. 09/407,769, filed Sep. 29, 1999, pending.
U.S. Appl. No. 09/393,677, filed Sep. 10, 1999, pending.
U.S. Appl. No. 08/624,228, filed Mar. 29, 1996, pending.
U.S. Appl. No. 08/698,068, filed Aug. 15, 1996, pending.
U.S. Appl. No. 08/733,134, filed Oct. 16, 1996, pending.
U.S. Appl. No. 08/738,659, filed Oct. 30, 1996, pending.

* cited by examiner

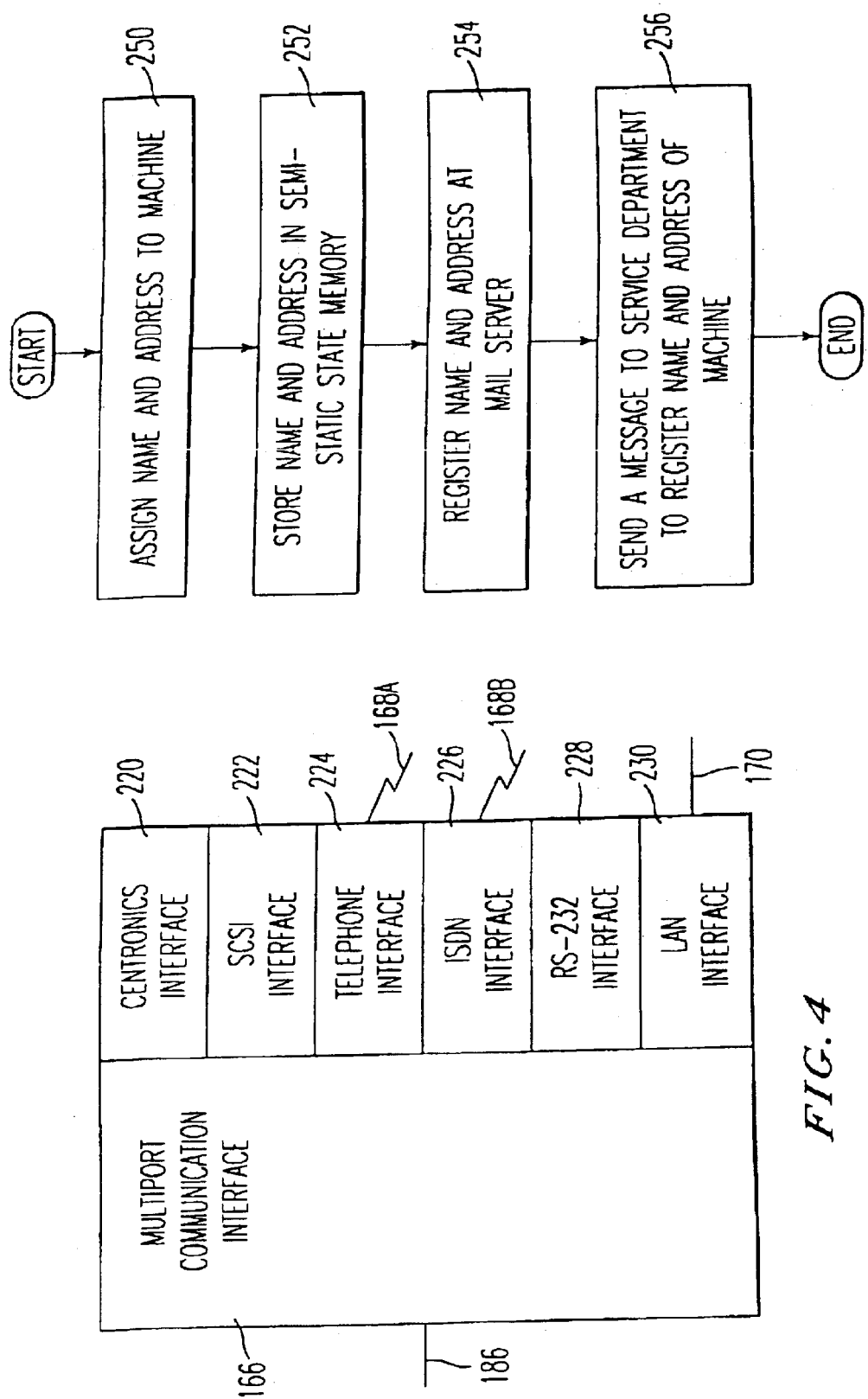

SYSTEM USES INTERNET ELECTRONIC MAIL FOR COMMUNICATING STATUS OF A MONITORED DEVICE TO A MONITORING DEVICE

CROSS-REFERENCES TO RELATED APPLICATIONS

The present application is a Division of application Ser. No. 08/463,002 filed on Jun. 5, 1995, now U.S. Pat. No. 5,819,110 entitled METHOD AND SYSTEM FOR DIAGNOSIS AND CONTROL OF MACHINES USING CONNECTION AND CONNECTIONLESS MODES OF COMMUNICATION and is also related to U.S. patent application Ser. No. 08/426,679 filed Apr. 24, 1995 and entitled "Method and Apparatus for Controlling and Communicating With Business Office Devices" which is a continuation of U.S. patent application Ser. No. 08/282,168 filed Jul. 28, 1994 and entitled "Method and Apparatus for Controlling and Communicating With Business Office Devices", now U.S. Pat. No. 5,412,779, which is a continuation of U.S. patent application Ser. No. 07/902,462 filed Jun. 19, 1992, now abandoned, which is a continuation of U.S. patent application Ser. No. 07/549,278, filed Jul. 6, 1990, now abandoned, the disclosure of each is incorporated herein by reference.

BACKGROUND OF THE INVENTION

1. Field of the Invention

The present invention is related to the remote monitoring, diagnosis and control of machines using connection- and connectionless-modes of communication and is more particularly related to monitoring, the control and diagnosis of business office machines such as copiers, printers, and facsimile machines. The invention is also related to the use and sharing of data bases containing information about the machines being monitored.

2. Discussion of the Background

U.S. Pat. No. 5,412,779 discloses the controlling of business office devices by a remote diagnostic station. However, the method of communication in this system and other known systems for controlling machines such as business office machines is to establish a connection between the machine and the diagnostic station and to use a connection-mode of communication.

The use of a dedicated communication connection between the machine and diagnostic station is more expensive as compared to the use of the Internet. On the other hand, the Internet has disadvantages in that some forms of communication over the Internet are slow and may be delayed, and have a problem in that the Internet is not a secure mode of transmission (i.e., communications may be monitored by others). In addition, the connection-mode access to an installed machine from the Internet may not be possible because of a security block by the firewall. However, even with the delays of a connectionless-mode of communication over the Internet, the inventor has found that the Internet can still provide a suitable medium for communication for some applications.

SUMMARY OF THE INVENTION

Accordingly, it is one object of the invention to provide a connectionless-mode of transmission between a machine and a remote diagnostic station. It is a further object of the invention to provide an alternative manner of communication such as a connection-mode of transmission in the event that the connectionless-mode of transmission is unavailable or not suitable.

It is a further object of the invention to provide a data base which stores diagnostic and operation information of the machine. It is yet a further object of the invention to share the data base information of the machines between various departments such as the service department, a marketing department, a manufacturing department, and an engineering department within a company.

These and other objects are accomplished by a system and method of diagnosing and controlling a machine using a connectionless-mode of communication. An inexpensive connectionless-mode of communication which may be employed by the present invention is the Internet. When a condition exists within the machine which needs urgent attention, a connectionless-mode of communication may be inappropriate. In this case, the mode of communication will be a connection-mode using a conventional telephone or ISDN line.

The machine being diagnosed and controlled may be connected to a conventional local area network (LAN). The local area network has a connection to the Internet through a firewall for security purposes.

When the machine is first connected to the network, the name and address of the machine are registered at the mail server and at the machine by the system administrator as part of installation. This allows incoming Internet e-mail to be routed to the machine by the mail server. Additionally, a connectionless message is transmitted to a remote station, for example, via Internet e-mail, in order to register the existence of the machine.

The invention additionally includes a data base having information of the machine(s) including information of the model, configuration, and capability of the machine(s) so that the remote station will know the machine's capabilities. The data base is shared among different groups such as between a service group, a marketing group, a manufacturing group and an engineering group in order to have quick and efficient access to information regarding the operating characteristics and reliability of the machines.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 illustrates details of the multi-port communication interface illustrated in FIG. 3;

FIG. 5 illustrates a process performed when a machine is initially installed;

DESCRIPTION OF THE PREFERRED EMBODIMENTS

Figure 1:
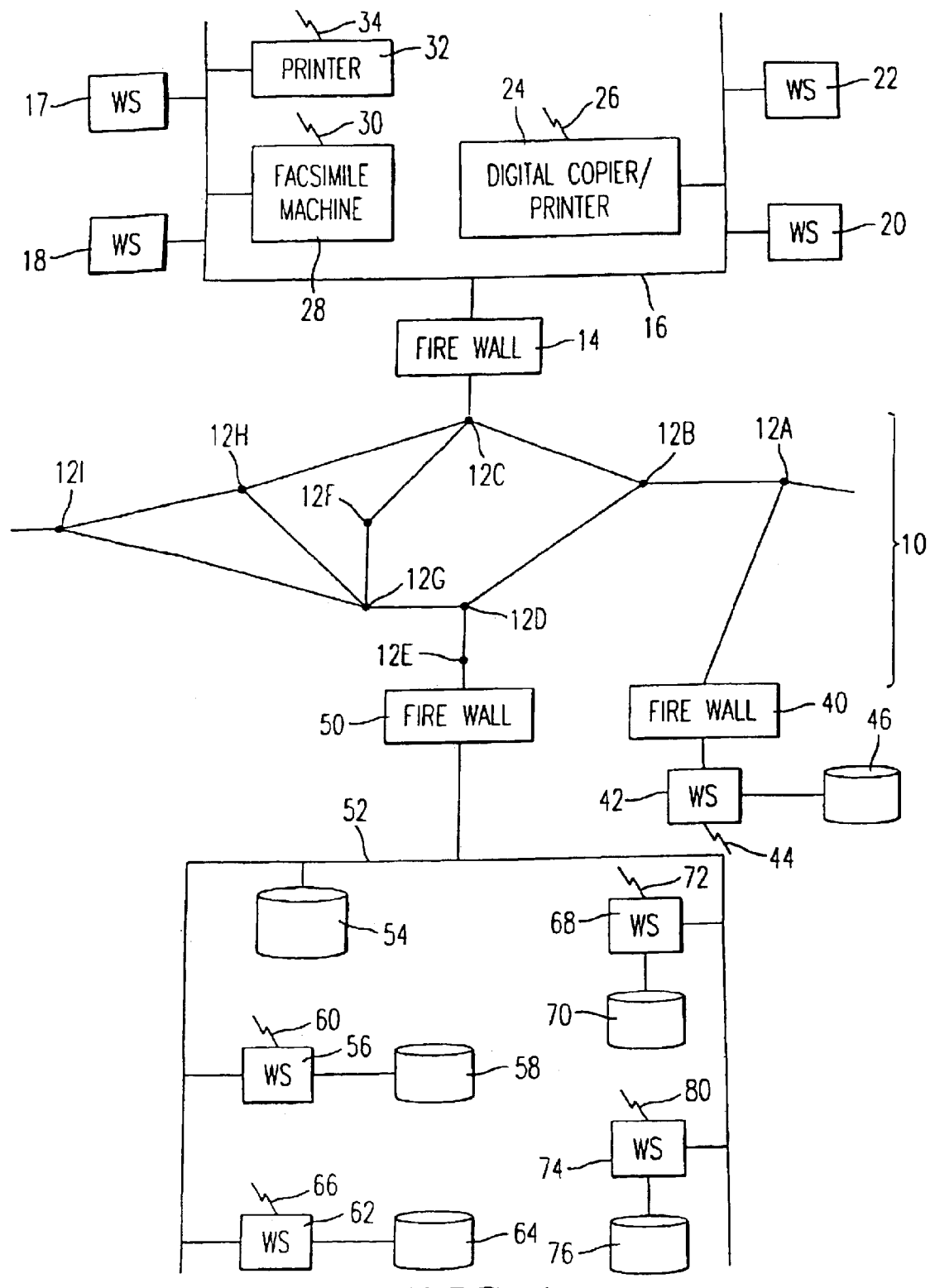
FIG. 1 illustrates three networked business office machines connected to a network of computers and data bases through the Internet.

Referring now to the drawings, wherein like numerals designate identical or corresponding parts throughout the several views, and more particularly to FIG. 1 thereof, there is illustrated a figure showing various machines and computers for monitoring, diagnosing and controlling the operation of the machines. In FIG. 1, there is a first network 16, such as a Local Area Network (LAN) connected to computer workstations 17, 18, 20 and 22. The workstations can be any type of computers including IBM Personal Computer compatible devices, Unix Based Computers, or Apple Macintoshes. Also connected to the network 16 are a digital copier/printer 24, a facsimile machine 28, and a printer 32. The devices 24, 28 and 32 are referred to as machines or monitored devices although other types of devices may be used as the machines or monitored devices. Also, a facsimile server (not illustrated) may be connected to the network 16 and have a telephone or ISDN connection. In addition to the digital copier/printer 24, facsimile machine 28, and printer 32 being connected to the network 16, these devices may also include conventional telephone and/or ISDN connections 26, 30 and 34, respectively. As is explained below, the business office machines or business devices 24, 28 and 32 communicate with a remote monitoring, diagnosis and control station, also referred to as a monitoring device, through the Internet via the network 16 or by a direct telephone or ISDN connection.

In FIG. 1, the Internet is generally designated by 10. The Internet 10 includes a plurality of interconnect computers designated by 12A–12I. The manner of communicating over the Internet is known through RFC documents obtained by FTP at NIC.DDN.MIL or at FTP NISC.SRI.COM. TCP/IP related communication is described for example in the book "TCP/IP Illustrated," Vol. 1, The Protocols, by Stevens, from Addison-Wesley Publishing Company, 1994. As the Internet is a network accessible by many people and organizations, it is not considered to be secure. Therefore, messages transmitted over the Internet should be encrypted to keep the messages confidential. Encryption mechanisms are known and commercially available which may be used with the present invention. For example, a C library function, crypt( ), is available from Sun Microcomputers for use with the Unix operating system, and other encryption and decryption routines are known and commercially available.

An additional security measure used in connecting a computer network to the Internet is a protective device known as a firewall. This device allows only authorized computers to access a network or other computer via the Internet. Firewalls are known and commercially available devices and, for example, include SunScreen from Sun Microsystems Inc.

In FIG. 1, a firewall 14 is connected between the Internet 10 and the network 16. Similarly, a firewall 50 is connected between the Internet 10 and a network 52. Also, a firewall 40 is connected between the Internet 10 and a workstation 42.

The network 52 is a conventional network and includes a plurality of workstations 56, 62, 68 and 74. These workstations may be different departments within a company such as a marketing, manufacturing, design engineering and customer service departments. In addition to the workstations connected via the network 52, there is a workstation 42 which is not directly connected to the network 52. Information in a data base stored in a disk 46 may be shared using proper encryption and protocols over the Internet to the workstations connected directly to the network 52. Also, the workstation 42 includes a direct connection to a telephone line and/or ISDN 44 and the data base in disk 46 may be accessed through the telephone line or ISDN.

Information of the business office machines 24, 28 and 32 may be stored in one or more of the data bases stored in the disks 46, 54, 58, 64, 70 and 76. Each of the customer service, marketing, manufacturing, and engineering departments may have their own data base or may share from one or more data bases. Each of the disks used to store data bases is a non-volatile memory such as a hard disk or optical disk. As an example, disk 64 contains the marketing data base, disk 58 contains the manufacturing data base, disk 70 contains the engineering data base and disk 76 contains the customer service data base. Alternatively, the disks 54 and 46 store one or more of the data bases.

In addition to the workstations 56, 62, 68, 74 and 42 being connected to the Internet, these workstations may also include a connection to a telephone line or ISDN which provides a secure connection to the machine being monitored diagnosed and/or controlled and is used during a connection-mode of communication. Additionally, if one of the Internet, and telephone or ISDN is not operating properly, the other can be automatically used for communication.

An important feature of the present invention is the use of a connectionless-mode of communication or transmission between a machine and a computer for diagnosis and controlling the machine. The IBM Dictionary of Computing by George McDaniel, 1994, defines a connectionless-mode transmission to be the transmission of a single unit of data from a source service access point to one or more destination service access points without establishing a connection. The IBM Dictionary also defines a connection-mode transmission to be the transmission of units of data from a source service access point to one or more destination service access points via a connection. The connection is established prior to data transfer and released following data transfer. Additional information about the connection-mode and the connectionless-mode of operation is described in the Handbook of Computer-Communication Standards, Vol. 1, $2^{nd}$ Edition, by William Stallings, 1990, which is incorporated herein by reference.

Figure 2:
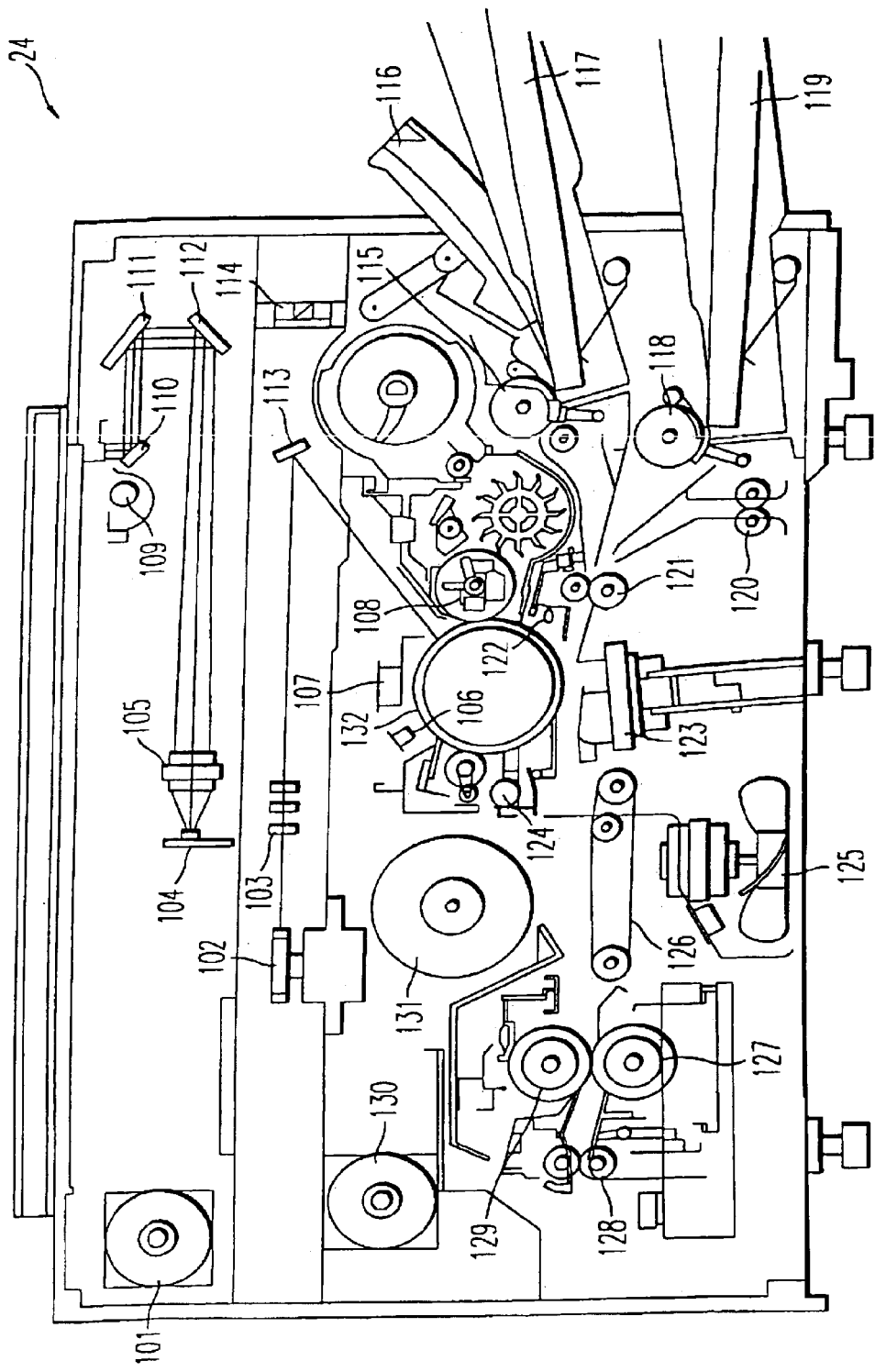
FIG. 2 illustrates the components of a digital copier/printer.

FIG. 2 illustrates the mechanical layout of the digital copier/printer 24 illustrated in FIG. 1. In FIG. 2, 101 is a fan for the scanner, 102 is a polygonal mirror used with a laser printer, and 103 designates an Fθ lens used to collimate light from a laser (not illustrated). Reference numeral 104 designates a sensor for detecting light from the scanner, 105 is a lens for focussing light from the scanner onto the sensor 104, and 106 is a quenching lamp used to erase images on the photoconductive drum 132. There is a charging corona unit 107 and a developing roller 108. Reference numeral 109 designates a lamp used to illustrate a document to be scanned and 110, 111 and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital copier/printer, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller, 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital copier.

Figure 3:
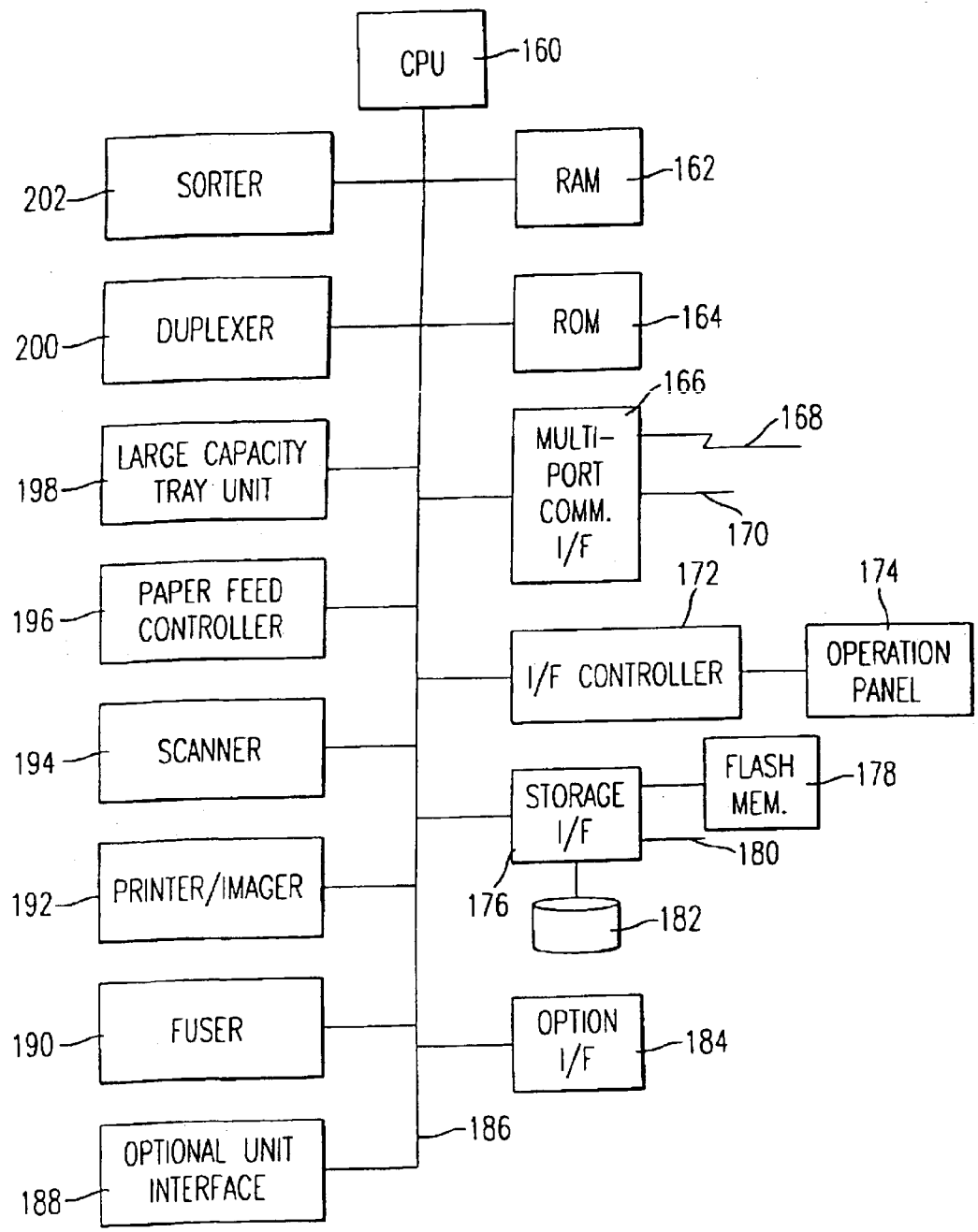
FIG. 3 illustrates electronic components of the digital copier/printer illustrated in FIG. 2.

FIG. 3 illustrates a block diagram of the electronic components illustrated in FIG. 2. The CPU 160 is a microprocessor and acts as the system controller. There is a random access memory 162 to store dynamically changing information including operating parameters of the digital copier. A read only memory 164 stores the program code used to run the digital copier and also information describing the copier (static-state data) such as the model number and serial number of the copier.

There is a multi-port communication interface 166 which allows the digital copier to communicate with external devices. Reference numeral 168 represents a telephone or ISDN line and 170 represents a network. Further information of the multi-port communication interface is described with respect to FIG. 4. An interface controller 172 is used to connect an operation panel 174 to a system bus 186. The operation panel 174 includes standard input and output devices found on a digital copier including a copy button, keys to control the operation of the copier such as number of copies, reducement/enlargement, darkness/lightness, etc. Additionally, a liquid crystal display is included within the operation panel 174 to display parameters and messages of the digital copier to a user.

A storage interface 176 connects storage devices to the system bus 186. The storage devices include a flash memory 178 which is a conventional EEPROM and a disk 182. The disk 182 includes a hard disk, optical disk, and/or a floppy disk drive. There is a connection 180 connected to the storage interface 176 which allows for additional memory devices to be connected to the digital copier. The flash memory 178 is used to store semi-static state data which describes parameters of the digital copier which infrequently change over the life of the copier. Such parameters include the options and configuration of the digital copier. An option interface 184 allows additional hardware such as an external interface to be connected to the digital copier.

On the left side of FIG. 3, the various sections making up the digital copier are illustrated. Reference numeral 202 designates a sorter and contains sensors and actuators used to sort the output of the digital copier. There is a duplexer 200 which allows a duplex operation to be performed by the digital copier and includes conventional sensors and actuators. The digital copier includes a large capacity tray unit 198 which allows paper trays holding a large number of sheets to be used with the digital copier. The large capacity tray unit 198 includes conventional sensors and actuators.

A paper feed controller 196 is used to control the operation of feeding paper into and through the digital copier. A scanner 191 is used to scan images into the digital copier and includes conventional scanning elements such as a light, mirror, etc. Additionally, scanner sensors are used such as a home position sensor to determine that the scanner is in the home position and a lamp thermistor to ensure proper operation of the scanning lamp. There is a printer/imager 192 which prints the output of the digital copier and includes a conventional laser printing mechanism, a toner sensor, and an image density sensor. The fuser is used to fuse the toner onto the page using a high temperature roller and includes an exit sensor, a thermistor to assure that the fuser is not overheating, and an oil sensor. Additionally, there is an optional unit interface 188 used to connect to optional elements of the digital copier such as an automatic document feeder, a different type of sorter/collator, or other elements which can be added to the digital copier.

FIG. 4 illustrates details of the multi-port communication interface 166. The digital copier may communicate to external devices through a Centronics interface 220 which receives or transmits information to be printed, a SCSI interface 222, a conventional telephone interface 224 which connects to a telephone line 168A, an ISDN interface 226 which connects to an ISDN line 168B, an RS-232 interface 228, and a LAN interface 230 which connects to a LAN 170. A single device which connects to both a Local Area Network and a telephone line is commercially available from Megahertz and is known as the Ethernet-Modem.

The CPU or other microprocessor or circuitry executes a monitoring process to monitor the state of each of the sensors of the digital copier, and a sequencing process is used to execute the instructions of the code used to control and operate the digital copier. Additionally, there is a central system control process executed to control the overall operation of the digital copier and a communication process used to assure reliable communication to external devices connected to the digital copier. The system control process monitors and controls data storage in a static state memory such as the ROM 164 of FIG. 3, a semi-static memory such as the flash memory 178 or disk 182, or the dynamic state data which is stored in a volatile or non-volatile memory such as the RAM 162 or the flash memory or disk 182. Additionally, the static state data may be stored in a device other than the ROM 164 such as a non-volatile memory including either of the flash memory 178 or disk 182.

The above details have been described with respect to a digital copier but the present invention is equally applicable to other business office machines such as a facsimile machine, a scanner, a printer, a facsimile server, or other business office machines. Additionally, the present invention includes other types of machines which operate using a connection-mode or connectionless-mode of communication such as a metering system including a gas, water, or electricity metering system, vending machines, or any other device which performs mechanical operations, has a need to be monitored, and performs a function. In addition to monitoring special purpose machines, and computers, the invention can be used to monitor, control, and diagnose a general purpose computer.

FIG. 5 illustrates a flowchart containing a process which is performed for a new machine such as a business office device in order to have it properly recognized by diagnostic, monitoring, and control equipment. After starting, step 250 has a user or device assign a name and address to the machine. In order for the device to transmit or receive communications, it is necessary to know where to send the communication and from where the communication originates. Step 252 stores the name and address in the semi-static state memory such as the flash memory 178 or the disk 182 illustrated in FIG. 3. This information is used both for a connection-mode of communication via a telephone or ISDN line, a connectionless-mode of communication such as using a conventional Internet electronic mail protocol, and also to have communication to the machine for ordinary purposes such as using the digital copier/printer for printing jobs via the local area network.

Once the information for the machine has been determined and then stored in step 252, it is necessary to register this information so that other devices will be able to access the machine. Therefore, the name and address of this device are registered in a mail server, for example, which will send and receive electronic mail for the network to which the mail server is connected. It is also desirable to register the machine as part of the local area network. Further, the monitoring devices to which the machine transmits messages are registered with the machine. Last, the machine is registered with a computer of a customer service department or other remote monitoring, controlling and/or diagnosing computer in order for the remote device to properly monitor and be aware of the existence of the machine. Step 256 sends a message to a service department or one of the other divisions illustrated in FIG. 1 in order to register the name, address, model number, serial number, or other information and capabilities of the machine in the customer service or another type of data base.

Figure 6:
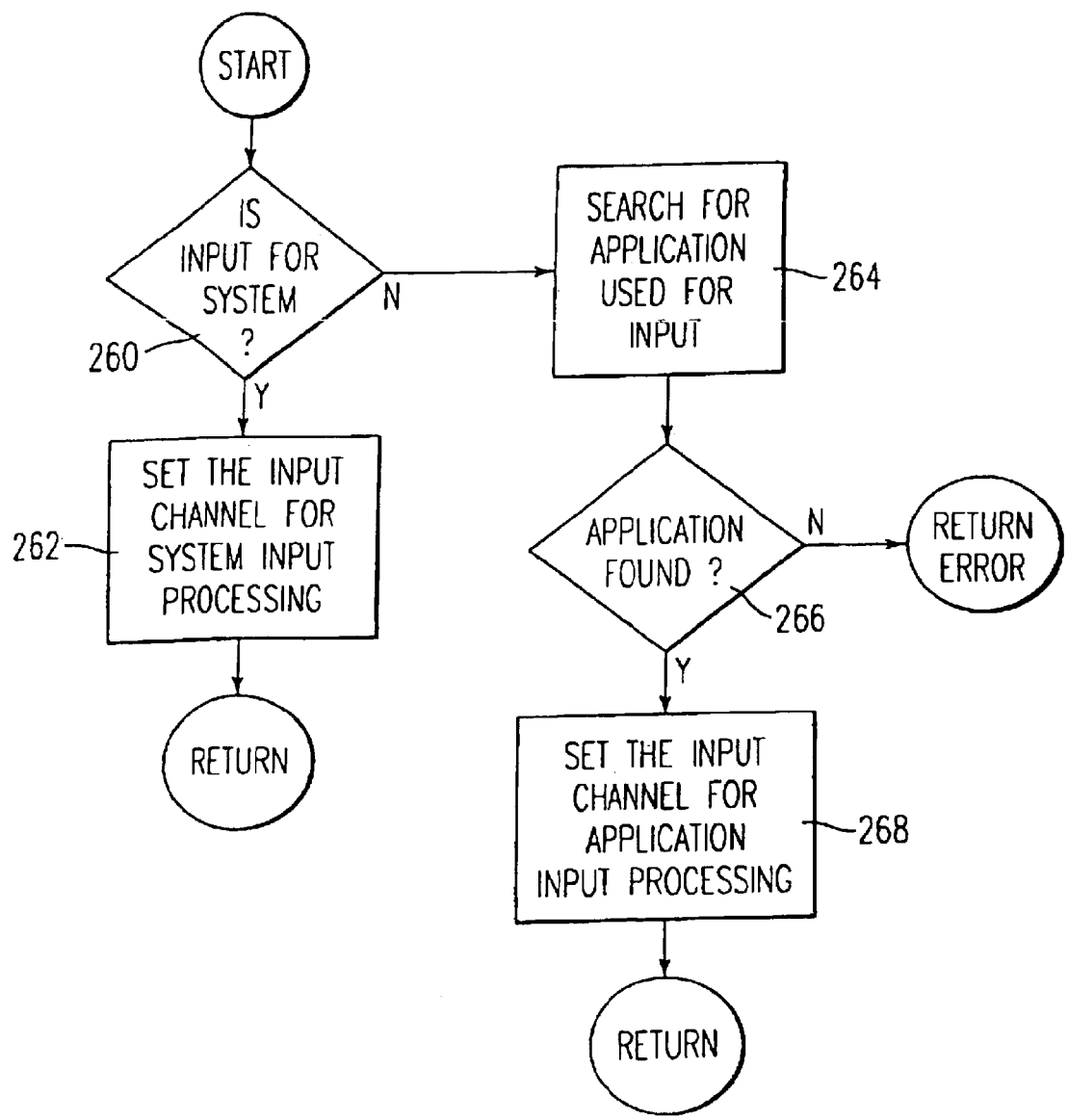
FIG. 6 illustrates a process for determining whether an incoming communication to the machine requires ordinary action or is for remote monitoring, diagnosis and control.

FIG. 6 illustrates a flowchart for determining the source of communication to the machine such as a business office device. After starting, step 260 determines if the input is for a system operation, or alternatively for a diagnosis, monitoring, or remote control operation. If the input is determined to be for the system in step 260, step 262 sets the input channel for ordinary system input processing. For example, if the machine were a printer, the received information would be used to produce a print job. If step 260 determines that the input is not for the system but for control, monitoring, or diagnosis of the machine, step 264 searches for an appropriate application for the input. A typical application would be a process for monitoring or testing of the machine. Step 266 examines if the application which was searched for is found and if it was not, an error is indicated. Otherwise, step 268 sets the input channel for the application input processing and the system is ready to process the incoming information.

Figure 7:
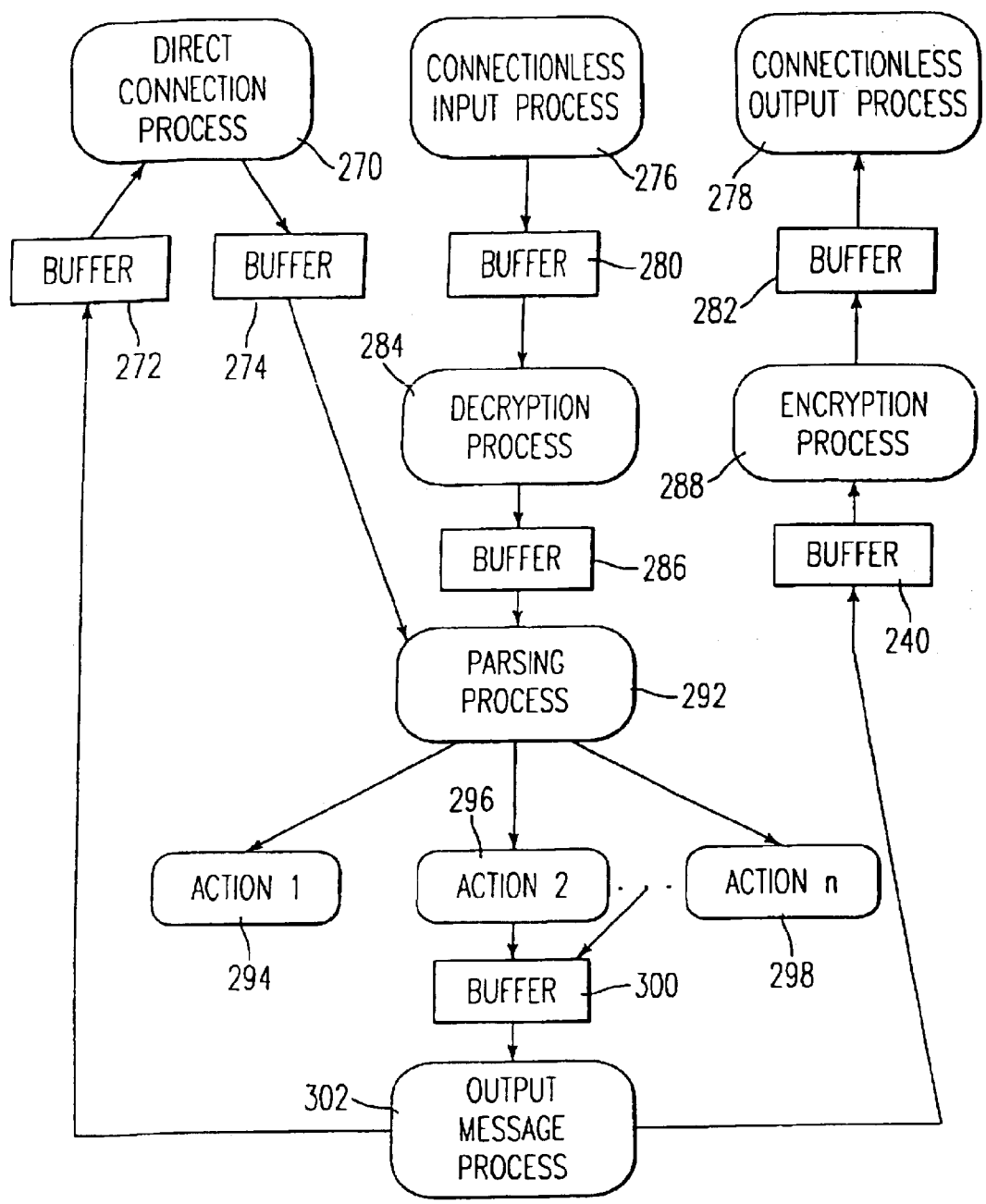
FIG. 7 is a data flow diagram of communications to and from the machine.

FIG. 7 illustrates a data flow diagram which processes incoming messages to and outgoing messages from a machine such as the digital copier/printer. A direct connection process 270 is used to process incoming and outgoing communications in a connection-mode of communication such as through a local area network, telephone line, or ISDN line. Incoming messages pass through buffer 274 to a parsing process 292 which performs parsing of incoming information in a known and conventional manner. The incoming information causes various actions such as the actions illustrated in 294, 296 and 298 to occur. Some actions require that a message be returned and the returned message is illustrated by the arrows leading to buffer 300. An output message process is performed which prepares an outgoing message to either the direct connection or connectionless process. The direct connection process passes through buffer 272 before passing through the direct connection process 270.

For a connectionless-mode of communication, there is a connectionless input processor 276 and a connectionless output processor 278. Incoming connectionless-mode communications pass through buffer 280 and a decryption process is performed in step 284. The decrypted information is stored in buffer 286 and passed to a conventional parsing process 292. As explained above, one or more of the actions 294, 296 and 298 are performed and outgoing messages pass through the buffer 300 to the output message process 302. Then, the connectionless-mode outgoing messages pass through a buffer 290, after which they are encrypted by the encryption process 288. The encrypted messages then pass through buffer 282 and are transmitted via the connectionless output process 278 over a connectionless network such as the Internet to their final destination.

Any type of a connectionless-mode of communication may be used by the present invention. An inexpensive and readily available medium through which connectionless messages may pass is the Internet processing electronic mail messages. The connectionless input and output processes may be according to any known Internet e-mail protocol such as used by the BSD Unix mail system which is incorporated into the SunOS 4.1.X. Also, other information describing Internet e-mail operations are readily available through various sources on the Internet itself. While the Internet provides an inexpensive manner of a connectionless-mode of communication, the Internet electronic mail system may be slow or unreliable and therefore, in certain circumstances, instead of using a connectionless process, a direct connection process as described below, is performed.

Figure 8:
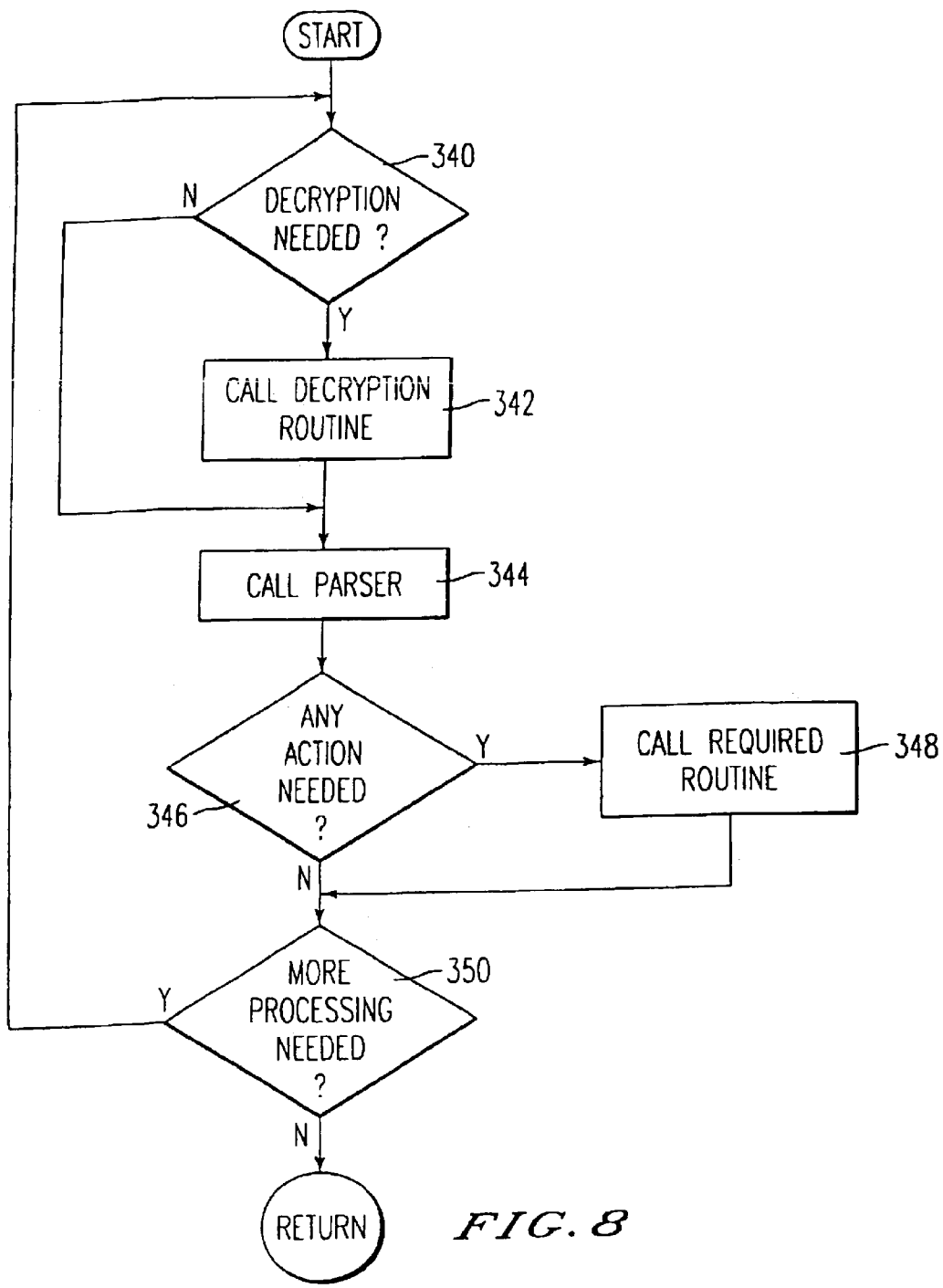
FIG. 8 is a flowchart illustrating the process of the data flow diagram of FIG. 7.

FIG. 8 illustrates a flowchart which may be used to implement the data flow diagram illustrated in FIG. 7. After starting, step 340 determines if decryption is needed and if it is, a decryption routine is performed in step 342. Step 344 then calls a parser which parses in a conventional manner and step 346 determines if any action needs to be taken. If it does, for example when information is to be transmitted back to the remote monitoring, diagnosis, or control device, step 348 calls the required routine. Step 350 determines if more processing is needed and flow returns back to step 340 for further processing. Otherwise, flow returns to the calling process.

Figure 9:
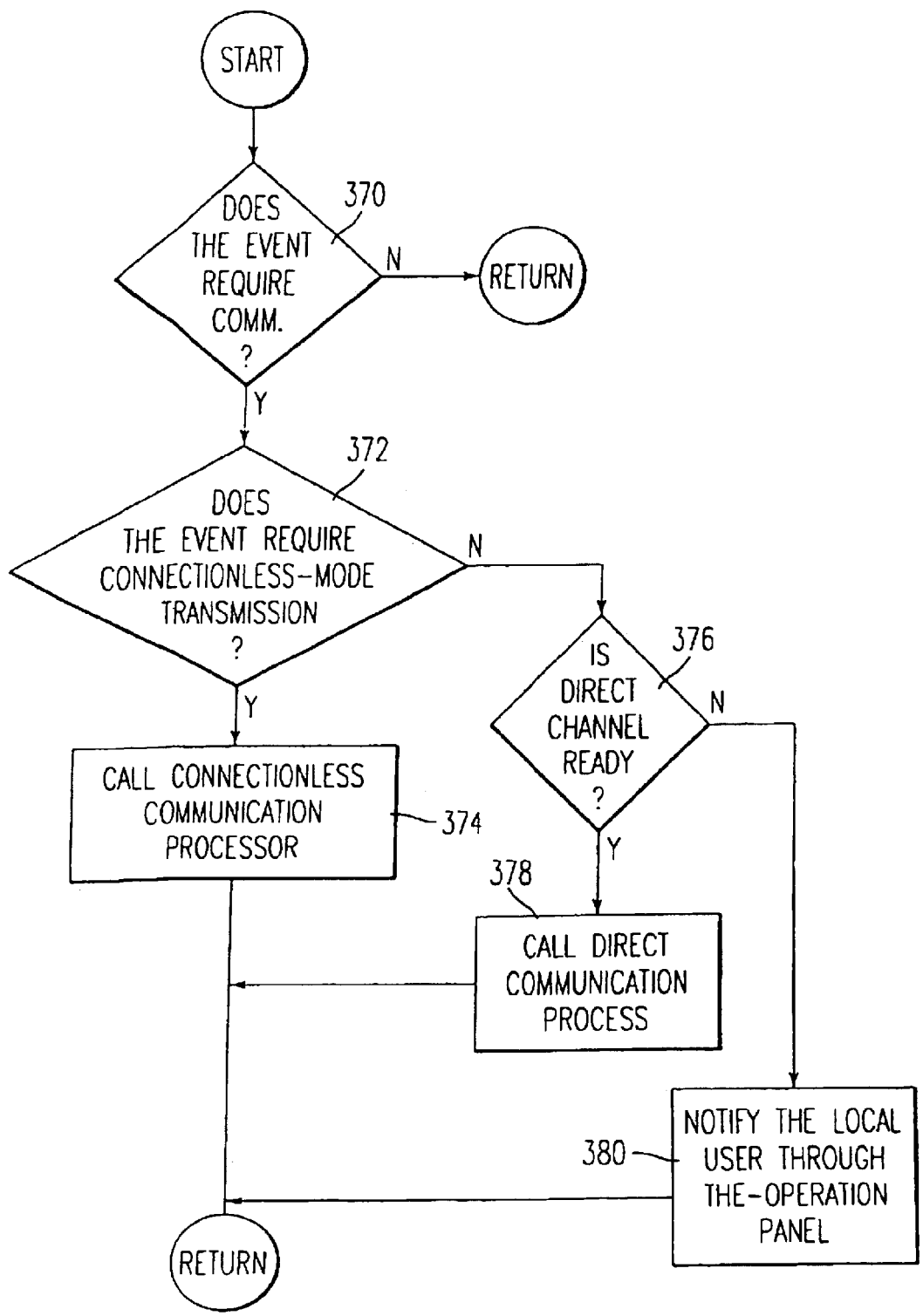
FIG. 9 is a flowchart illustrating the processing performed when communication is initiated by the machine.

FIG. 9 illustrates a process performed within the machine which determines whether a connection-mode or a connectionless-mode of communication is needed. After starting, step 370 determines if an event requires communication and if it does not, flow returns to the calling process. If communication is needed, step 372 determines whether the event requires a connectionless-mode or a connection-mode of transmission. Any type of high priority event for which immediate attention is needed or which the remote monitoring device would be interested in on an expedited basis is sent in a connection-mode of communication. This may be used when a hazardous condition exists within the machine or when something in the machine needs immediate attention. For example, if a thermistor in the fuser unit senses a high and unsafe temperature, a direct connection mode may be used. However, the transmission of a weekly or monthly report indicating the usage and a normal condition state in the machine can use the slower connectionless-mode of communication. Additionally, when the connectionless mode of communication is not properly functioning, the connection-mode of communication is used. For example, if an Internet e-mail message is not properly received by the monitoring device, a direct connection-mode of communication is used. The e-mail message may contain a request for acknowledgement of receipt and if an acknowledgement is not received within a predetermined time (e.g. 3–24 hours) then a connection-mode communication is used to re-transmit the message. Also, if a connection-mode of communication is not properly functioning, then the connectionless-mode of communication may be used.

If step 372 determines that an event does not require a connectionless-mode of communication, step 376 determines if the direct communication channel is ready. For example, it determines if the telephone or ISDN line is available. If it is, a direct communication process is performed in step 378 to transmit the appropriate information. If the direct channel is not ready, step 380 notifies the user through the operation panel that there is a problem with the telephone, ISDN, or other direct connection device or communication medium. If step 372 determines that the event requires a connectionless-mode of transmission, step 374 calls a connectionless communication process. The process of FIG. 9 then returns to the calling process.

Figure 10:
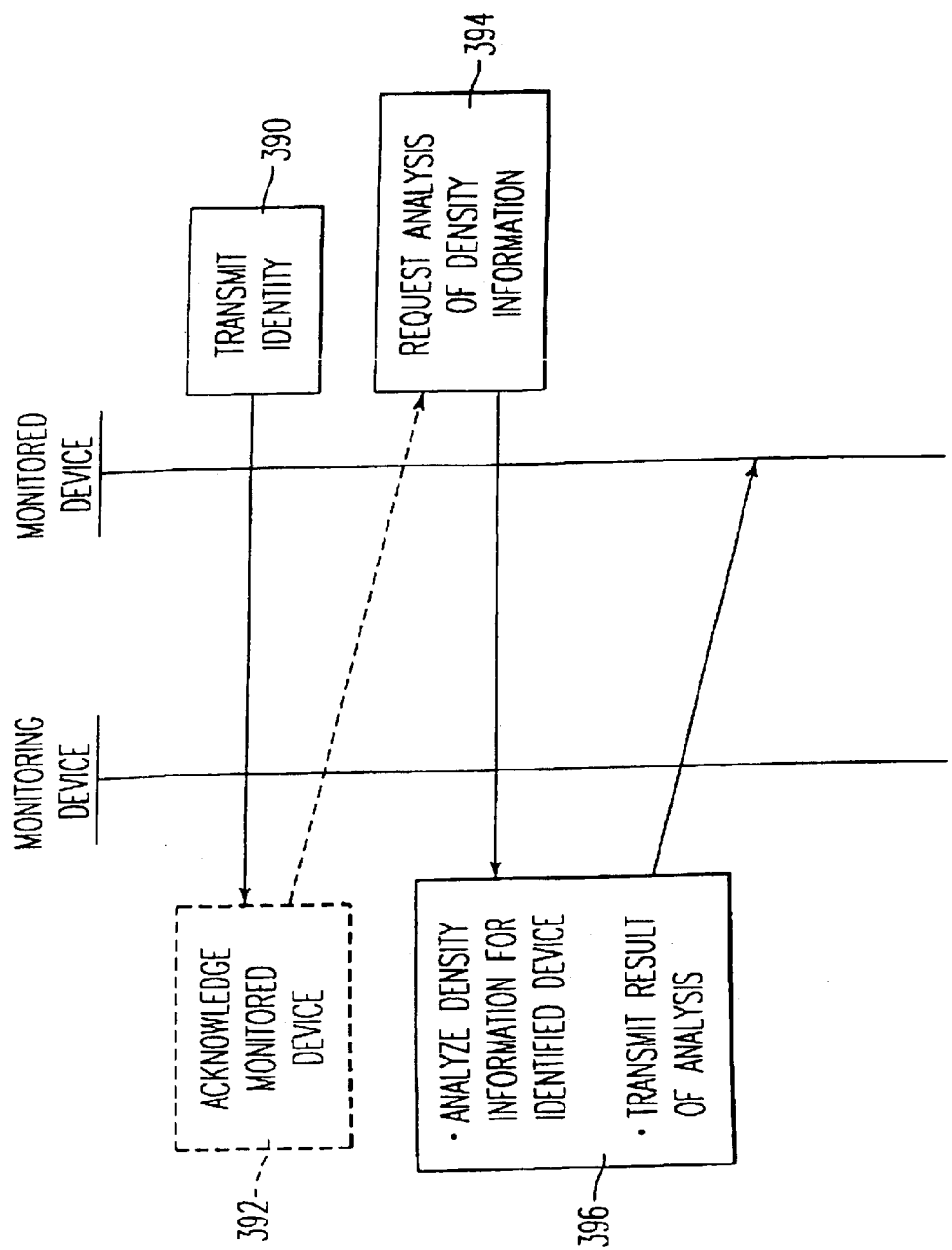
FIG. 10 illustrates connectionless communication from the machine to the remote monitoring device.

FIG. 10 illustrates a connectionless-mode of communication initiated by the machine which is being remotely diagnosed, controlled, and monitored. Initially, the monitored device transmits its identity in step 390. The monitored device then requests an analysis of the density information of the digital copier in step 394. The monitoring device analyzes the density information for the specific digital copier corresponding to the transmitted identity in order to determine if the print density of the digital copier is too dark or too light. Step 396 then transmits the results of the density analysis back to the monitored device. If the process of FIG. 10 used a connection-mode of communication, the monitoring device would execute step 392 which acknowledged receipt of the identity information and step 394 would not be performed until the acknowledgement was received. However, in a connectionless-mode of communication, step 392 is not performed and the transmission of the identity would be immediately followed by the request for analysis.

As with the business office machine, the remote device for controlling, diagnosing, and monitoring the machine may initiate either a connection-mode or connectionless-mode of communication. As with the machine, when the remote monitoring device needs to send urgent information or needs an urgent response from the machine, a connection-mode of communication is used. When time is not critical, the remote device may use a connectionless-mode of communication. For example, if new control software needs to be downloaded to the business office machine due to a bug in the program in the business office machine which causes a dangerous condition, a direct connection-mode of communication will be used. Also, as described with respect to the monitored device, if the monitoring device experiences a problem with one of the modes of communication, one of the other modes may be used.

Figure 11:
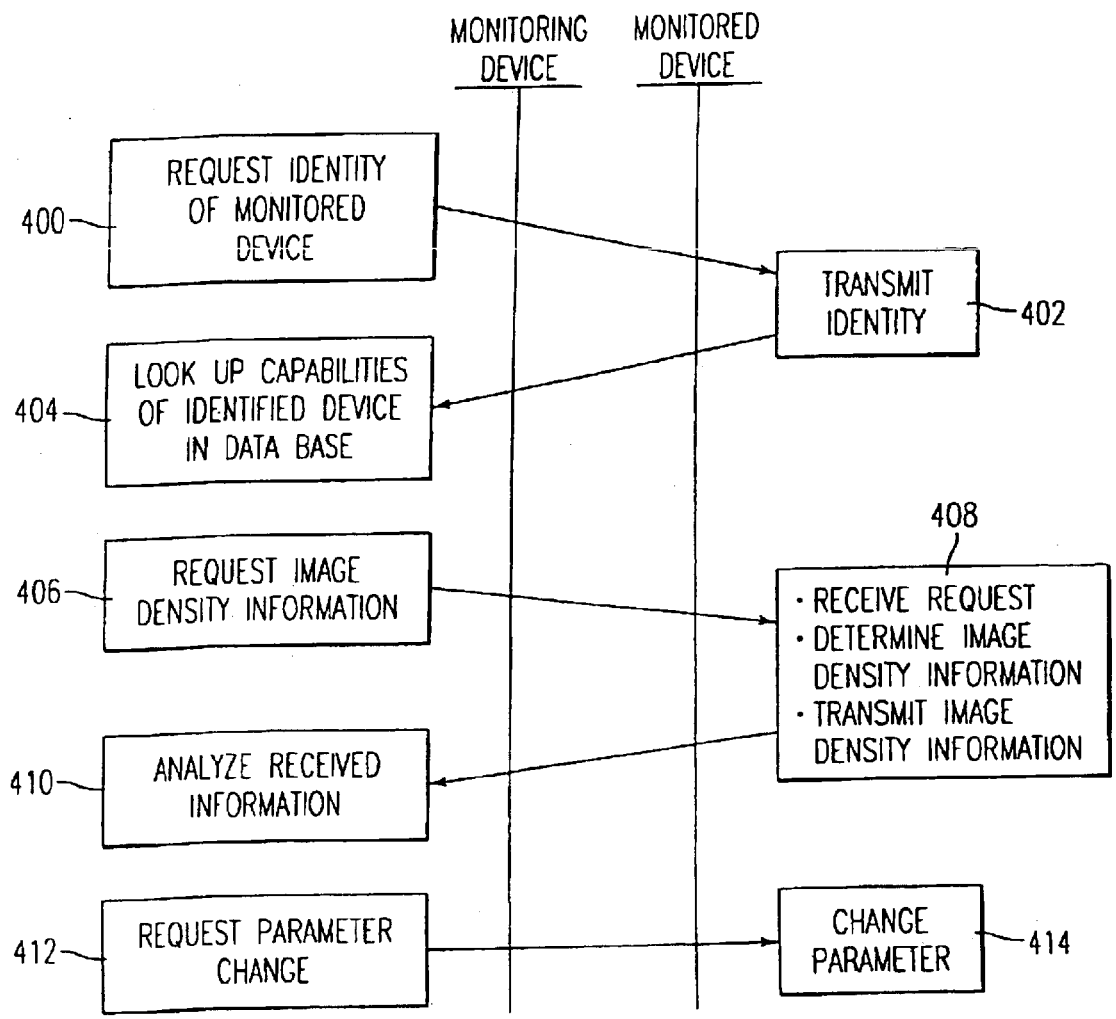
FIG. 11 illustrates a connection-mode of transmission between the monitoring device and the machine being monitored.

FIG. 11 illustrates a connection-mode of communication initiated by the monitoring device. Initially, step 400 requests the identity of the monitored device and the monitored device transmits its identity in step 402. In step 404, the monitoring device verifies the identity and looks up the capabilities of the identified device in a data base. The data base describes various information of the monitored device or machine such as service history, optional equipment, usage information, or other information. In step 406, the monitoring device requests image density information from the monitored device. In step 408, the monitored device receives the request for image density information, determines the image density information (or looks up previously stored image density information) and transmits the image density information back to the monitoring device in step 408. In step 410, the monitoring device analyzes the received information (i.e., compares the received information with information looked up in the data base) and determines that it is appropriate to change parameters of the monitored device. Step 412 requests parameters of the device to be changed and transmits an appropriate command. In step 414, the monitored device changes its operating parameters in accordance with the received command.

Figure 12A:
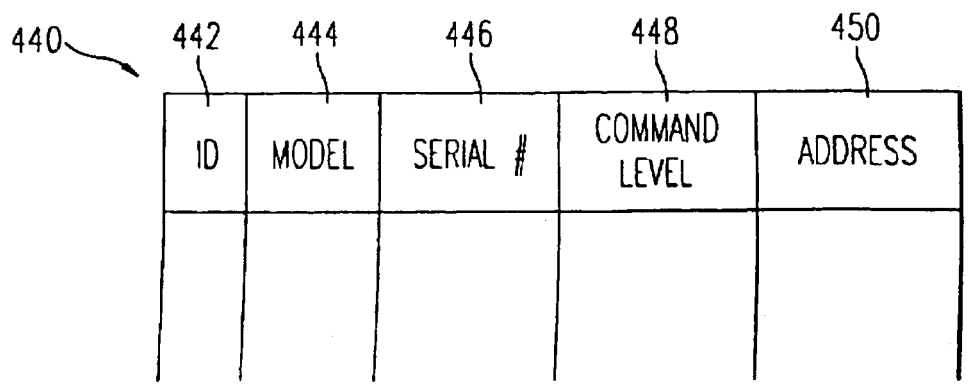
FIG. 12A illustrates the main components of the service data base.
Figure 12B:
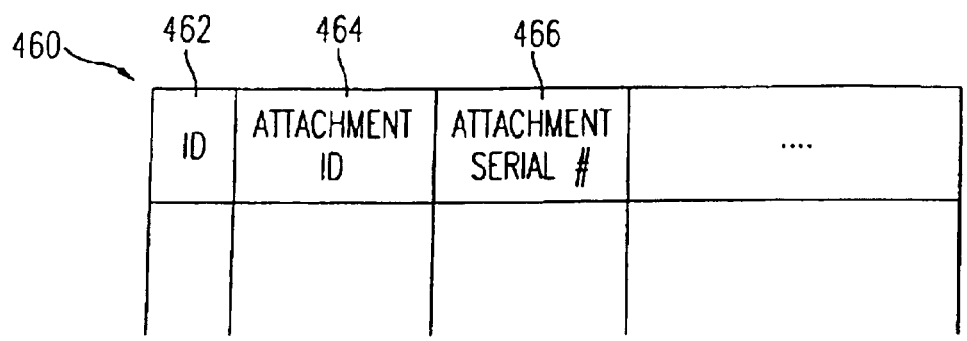
FIG. 12B illustrates information of an attachment and options data base.
Figure 12C:
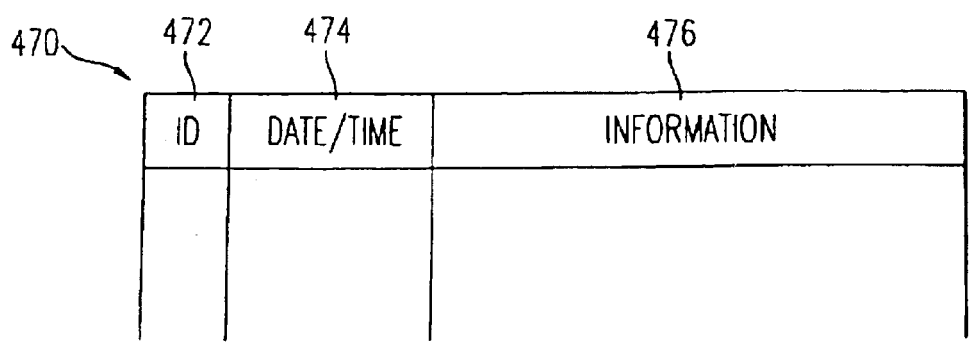
FIG. 12C illustrates a data base used for keeping track of the history of various machines.

FIGS. 12A through 12C illustrate various data base structures which may be used by the invention. FIG. 12A illustrates a simple data base 440 containing the machine ID 442, the model number 444, the serial number 446, a command level 448, and an address 450. The ID 442 is a unique describer of the device and used to link various data bases describing the device such as the data bases illustrated in FIGS. 12B and 12C. The command level 448 indicates whether the machine can process simple or complex instruction sets. The address 450 contains the connection and connectionless address information including the network address, phone number, name, and any other information necessary to identify the machine.

Linked to the data base in FIG. 12A are the data bases in FIGS. 12B and 12C which respectively describe attachment information and the history of the machine. The data base structure 460 illustrated in FIG. 12B is for attachments and options for machines contained in the data base of FIG. 12A and contains an ID field 462 which corresponds to the ID field 442 of FIG. 12A. The attachment ID field 464 indicates the type of optional attachments connected to the machine such as a sorter, automatic document feeder, or other attachment. The attachment serial number 446 is the serial number of the attachment connected to the machine. The attachment ID field may be linked to a data base describing various features of the attachment data base. Other fields may be contained in the attachment and option data base 460.

The history of the machine is stored in a separate data base illustrated in FIG. 12C. The data base structure 470 again contains an ID field 472 which is used to link the various data bases. A date and time field 474 and an information field 476 is used to describe malfunctions or other special conditions and events within the machine including the date and time at which an event occurred.

The data bases as illustrated in FIGS. 12A–12C are illustrative of the type of information which is stored regarding the machine. Even though illustrated as separated data bases, the implementation of the data bases may include more or less data bases. Different departments within a company may maintain different data bases describing information about the various machines. The service data base will be most complete about individual machines, contain a complete service history of each machine, and may be stored at a customer service division. Separate manufacturing, engineering and marketing department data bases may be maintained and use the information generated from the machine. The different data bases may be linked through different fields. For example, the service data base may be linked to the manufacturing data base through the serial and model numbers. The manufacturing data base and engineering data base may be linked through a version and model number, and the service data base and engineering data base may be linked through model numbers. Any type of known data base scheme may be used to maintain and share information, as needed.

Separate analysis and decision software may be created which allows a user to make a specific inquiry into any one or more of the data bases. The user may formulate any type of query and the data bases searched to produce the requested information. The analysis and decision software is also used to generate monthly or other regular reports describing information of the machines and may generate an alert or other type of warning when a malfunction occurs.

TABLE 1A

Monthly Report Message From Copiers

Copy count and job count
List of changed parts detected
List of parameters changed
Use of duplexing
Use of reduction
Use of enlargement
Copy counts for various paper sizes
Use of manual feed

TABLE 1B

Monthly Report Message From Printers

Copy count and job count
List of changed parts/supplies
List of set up changes
Use of duplexing if available
Copy counts for various paper sizes
Numbers of jobs for various printer languages such as PCL5 and PostScript
Use of manual feed

TABLE 1C

Monthly Report Message From Facsimile Machines

Number of transmissions and receptions
Number of pages sent
Number of pages received
Counts for special features such as speed dials Tables 1A–1C illustrate monthly report messages which may be generated for copiers, printers, and facsimile machines. These monthly reports simply show the parameters, usage, and other information of the machines and of course may be different and include more or less information, as desired.

Table 2 illustrates various communication commands which may be used to implement the communication operations described herein. The left-side of the table contains the operators and the right-side of the table contains the operands. In the table, T indicates a target which is a specific address, parameter, sensor, or stored data, and V is a value. The commands illustrated in Table 2 are the set command which allows a specific address, parameter, or stored data to be set to the value contained in V. Similarly, the get command allows specific target information to be obtained. The report operator is included in a report from the monitored machine of information requested by the get operator. The set_list, get_list and report_list allow more than one target and value to be obtained, set or generated using a single operator. The illustrated copy commands allow information to be copied from one memory address to another memory address, from a memory address to a disk, and from a disk to a memory location. The command_not understood operator indicates that a specific operator and/or operand(s) was not understood.

TABLE 3A

| Commands to Copier | |
|---|---|
| get | id; |
| set | sorter yes; |
| set | adf yes; |
| get | configuration; |
| get | A100; |
| set | A100 FFAA; |
| get | copy_count; |
| get | jam-count; |
| get | last_toner-change; |
| set | boot A100; |

TABLE 3B

| Response from Copier | |
|---|---|
| report | id AX301B3330; |
| report | configuration LIST (sorter yes, adf yes, large_capacity_tray no, . . .); |
| report | A100 AABB; |
| report | A100 FFAA; |
| report | copy-count 9895; |
| report | jam-count 0; |
| report | last_toner_change Apr. 12, 1995; |

TABLE 2

Communication Commands

| Operator | Operands | T: Target, V: Value |
|---|---|---|
| Set | T V | |
| Get | T | |
| Report | T V | |
| Set_List | $T_1 V_1, T_2 V_2, \ldots, T_n V_n$ | |
| Get_List | $T_1 T_2, \ldots, T_n$ | |
| Report_List | $T_1 V_1, T_2 V_2, \ldots, T_n v_n$ | |
| Copy_Memory_To_Memory | Source Destination Num_Byte | |
| Copy_Memory_To_Disk | Source Name Num_Byte | |
| Copy_Disk_To_Memory | Name Destination | |
| Command_Not_Understood | Operator and Operands | |

Table 3A illustrates commands which may be sent to a copier from a remote monitoring and diagnostic device and Table 3B illustrates the response from the copier after receiving the commands of Table 3A. After the get id command in Table 3A, the response from the copier is a report of the id which is AX301B3330;. The second line of Table 3B illustrates the use of "LIST". In this case, the configuration includes more than one target parameter and therefore, the group of target parameters and their value are preceded by the "LIST" operator. The information in Tables 3A and 3B has been created for illustrative purposes. By setting the sorter and automatic document feeder (adf) in the second and third commands to the copier to be activated, no response from the copier is generated. In response to the get configuration command, there is a report generated from the copier in the second response from the copier. Also illustrated in Tables 3A and 3B are the getting and setting of a specific memory location A100. The last command in Table 3A is the setting of boot to A100. This means that upon rebooting or reinitialization of the copier, the memory location A100 is to be read.

In addition to the machines accessing the Internet through a LAN, the machine can alternatively access the Internet through a telephone line or ISDN via an Internet access provider or a dial-up service such as America On Line. In this manner, a machine that is not connected to a network can still use a connectionless mode of connection. In this case, the machine will have to periodically dial the Internet provider in order to receive incoming Internet e-mail messages.

This invention may be conventionally implemented using a conventional general purpose digital computer programmed according to the teachings of the present invention, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuit, as will be readily apparent to those skilled in the art.

The present invention also includes a computer program product which is a storage medium including instructions which can be used to program a computer to perform a process of the invention. The storage medium can include, but is not limited to, any type of disk including floppy disks, optical disks, CD-ROMs, and magneto-optical disks, ROMS, RAMs, EPROMs, EEPROMs, magnetic or optical cards, or any type of media suitable for storing electronic instructions.

The above described system may used with conventional machines including conventional business office machines using add-on equipment constructed in accordance with the present teachings and installed in or outside of the machine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for communicating, comprising:
   receiving an electronic mail message from a monitoring device, the electronic mail message being communicated using an Internet email protocol;
   analyzing the electronic mail message; and
   performing an action by a business office device for at least one of monitoring, controlling, and diagnosing the business office device in response to the electronic mail message, after the electronic mail message is analyzed, the business office device being selected from a group consisting of a printer, a scanner, a copier, a metering system, and a vending machine.

2. A method according to claim 1, wherein:
   said step of receiving receives an Internet electronic mail message which has been transmitted over the Internet,
   said step of analyzing analyzes the Internet electronic mail message, and
   said step of performing comprises performing the action by the business office device, in response to the Internet electronic mail message, after the Internet electronic mail message is analyzed.

3. A method according to one of claims 1 and 2, wherein:
   said step of performing an action comprises performing a mechanical action by the business office device.

4. A method according to claim 3, further comprising the step of:
   transmitting an electronic mail message which includes a response message which contains information of the business office device including information obtained from sensors, when the electronic mail message which has been received requests a value to be returned.

5. A method according to claim 3, further comprising the step of:
   transmitting over the Internet an Internet electronic mail message which includes a response message which contains information of the business office device including information obtained from sensors, when the electronic mail message which has been received requests a value to be returned.

6. A method according to claim 3, wherein:
   the steps of receiving and analyzing are performed by the business office device.

7. A method according to claim 3, wherein the receiving step comprises:
   receiving the electronic mail message which includes an identifier followed by an "@" symbol followed by a domain name.

8. A method according to claim 7, wherein the receiving step further comprises:
   receiving the electronic mail message which includes a description of an encoding type of the e-mail message.

9. A method according to claim 3, wherein the receiving step comprises:
   receiving the electronic mail message through a Local Area Network ("LAN").

10. A method according to claim 9, wherein the receiving step comprises:
    receiving the electronic mail message without using a telephone line.

11. A method according to claim 3, wherein the receiving step comprises:
    receiving the electronic mail message without using a telephone line.

12. A method according to one of claims 1 and 2, further comprising the step of:
    transmitting an electronic mail message which includes a response message which contains information of the business office device including information obtained from sensors, when the electronic mail message which has been received requests a value to be returned.

13. A method according to one of claims 1 and 2, further comprising the step of:

transmitting over the Internet an Internet electronic mail message which includes a response message which contains information of the business office device including information obtained from sensors, when the electronic mail message which has been received requests a value to be returned.

14. A method according to one of claims 1 and 2, wherein: the steps of receiving and analyzing are performed by the business office device.

15. A method according to one of claims 1 and 2, wherein the analyzing step includes:

parsing the electronic mail message; and determining an action which the electronic mail message requests to be taken.

16. A method according to claim 15, wherein the step of performing an action comprises:

transmitting a response message from the business office device to the monitoring device in response to the electronic mail message.

17. A method according to claim 16, wherein the step of transmitting comprises:

transmitting the response message which contains information of the business office device including information obtained from sensors, when the received electronic mail message requests a value to be returned.

18. A method according to claim 17, wherein the step of transmitting comprises:

transmitting, through Internet electronic mail, the response message which is an Internet electronic mail message.

19. A method according to one of claims 1 and 2, wherein the receiving step comprises:

receiving the electronic mail message which includes an identifier followed by an "@" symbol followed by a domain name.

20. A method according to claim 19, wherein the receiving step further comprises:

receiving the electronic mail message which includes a description of an encoding type of the e-mail message.

21. A method according to one of claims 1 and 2, wherein the receiving step comprises:

receiving the electronic mail message through a firewall of a network which includes the business office device.

22. A method according to claim 21, wherein the receiving step further comprises:

receiving the electronic mail message which includes an identifier followed by an "@" symbol followed by a domain name.

23. A method according to claim 22, wherein the receiving step further comprises:

receiving the electronic mail message which includes a description of an encoding type of the e-mail message.

24. A method according to one of claims 1 and 2, wherein the receiving step comprises:

receiving the electronic mail message through a Local Area Network ("LAN").

25. A method according to claim 24, wherein the receiving step comprises:

receiving the electronic mail message without using a telephone line.

26. A method according to one of claims 1 and 2, wherein the receiving step comprises:

receiving the electronic mail message without using a telephone line.

27. A method according to claim 1, wherein:

the step of performing an action by a business office device performed by the business office device which is at least one of a printer, copier, facsimile machine, and scanner.

28. A system for communicating, comprising:

means for receiving an electronic mail message from a monitoring device, the electronic mail message being communicated using an Internet email protocol;

means for analyzing the electronic mail message; and means for performing an action by a business office device for at least one of monitoring, controlling, and diagnosing the business office device, in response to the electronic mail message, after the electronic mail message is analyzed, the business office device being selected from a group consisting of a printer, a scanner, a copier, a metering system, and a vending machine.

29. A system according to claim 28, wherein:

said means for receiving receives an Internet electronic mail message which has been transmitted over the Internet, said means for analyzing analyzes the Internet electronic mail message, and said means for performing comprises means for performing the action by the business office device, in response to the Internet electronic mail message, after the Internet electronic mail message is analyzed.

30. A system according to one of claims 28 and 29, wherein:

said means for performing an action comprises means for performing a mechanical action by the business office device.

31. A system according to claim 30, further comprising:

means for transmitting an electronic mail message which includes a response message which contains information of the business office device including information obtained from sensors, when the electronic mail message which has been received requests a value to be returned.

32. A system according to claim 30, further comprising:

means for transmitting over the Internet an Internet electronic mail message which includes a response message which contains information of the business office device including information obtained from sensors, when the electronic mail message which has been received requests a value to be returned.

33. A system according to claim 30, wherein:

the means for receiving and means for analyzing are both part of the business office device.

34. A system according to claim 30, wherein the means for receiving comprises:

means for receiving the electronic mail message which includes an identifier followed by an "@" symbol followed by a domain name.

35. A system according to claim 34, wherein the means for receiving further comprises:

means for receiving the electronic mail message which includes a description of an encoding type of the e-mail message.

36. A system according to claim 35, wherein the means for receiving comprises:

means for receiving the electronic mail message through a Local Area Network ("LAN").

37. A system according to claim 36, wherein the means for receiving comprises:

means for receiving the electronic mail message without using a telephone line.

38. A system according to claim 30, wherein the means for receiving comprises:

means for receiving the electronic mail message without using a telephone line.

39. A system according to one of claims 28 and 29, further comprising:

means for transmitting an electronic mail message which includes a response message which contains information of the business office device including information obtained from sensors, when the electronic mail message which has been received requests a value to be returned.

40. A system according to one of claims 28 and 29, further comprising:

means for transmitting over the Internet an Internet electronic mail message which includes a response message which contains information of the business office device including information obtained from sensors, when the electronic mail message which has been received requests a value to be returned.

41. A system according to one of claims 28 and 29, wherein:

the means for receiving and means for analyzing are both part of the business office device.

42. A system according to one of claims 28 and 29, wherein the means for analyzing includes:

means for parsing the electronic mail message; and means for determining an action which the electronic mail message requests to be taken.

43. A system according to claim 42, wherein the means for performing an action comprises:

means for transmitting a response message from the business office device to the monitoring device in response to the electronic mail message.

44. A system according to claim 43, wherein the means for transmitting comprises:

means for transmitting the response message which contains information of the business office device including information obtained from sensors, when the received electronic mail message requests a value to be returned.

45. A system according to claim 44, wherein the means for transmitting comprises:

means for transmitting, through Internet electronic mail, the response message which is an Internet electronic mail message.

46. A system according to one of claims 28 and 29, wherein the means for receiving comprises:

means for receiving the electronic mail message which includes an identifier followed by an "@" symbol followed by a domain name.

47. A system according to claim 46, wherein the means for receiving further comprises:

means for receiving the electronic mail message which includes a description of an encoding type of the e-mail message.

48. A system according to one of claims 28 and 29, wherein the means for receiving comprises:

means for receiving the electronic mail message through a firewall of a network which includes the business office device.

49. A system according to claim 48, wherein the means for receiving further comprises:

means for receiving the electronic mail message which includes an identifier followed by an "@" symbol followed by a domain name.

50. A system according to claim 49, wherein the means for receiving further comprises:

means for receiving the electronic mail message which includes a description of an encoding type of the e-mail message.

51. A system according to one of claims 28 and 29, wherein the means for receiving comprises:

means for receiving the electronic mail message through a Local Area Network ("LAN").

52. A system according to claim 51, wherein the means for receiving comprises:

means for receiving the electronic mail message without using a telephone line.

53. A system according to one of claims 28 and 29, wherein the means for receiving comprises:

means for receiving the electronic mail message without using a telephone line.

54. A system according to claim 28, wherein the means for performing an action by a business office device is performed by the business office device which is at least one of a printer, copier, facsimile machine, and scanner.

* * * * *

UNITED STATES PATENT AND TRADEMARK OFFICE
CERTIFICATE OF CORRECTION

| | | |
|---|---|---|
| PATENT NO. | : 6,970,952 B2 | Page 1 of 1 |
| APPLICATION NO. | : 08/738461 | |
| DATED | : November 29, 2005 | |
| INVENTOR(S) | : Tetsuro Motoyama | |

It is certified that error appears in the above-identified patent and that said Letters Patent is hereby corrected as shown below:

In Column 13, line 53: After "may" insert --be--.

In Column 16, line 62: Change "claim 35" to --claim 30--.

Signed and Sealed this

Twenty-second Day of May, 2007

JON W. DUDAS
*Director of the United States Patent and Trademark Office*